Jan. 22, 1935.   F. W. COTTERMAN   1,988,440
AUTOMATIC AUTOMOTIVE TRANSMISSION GEARING
Filed Sept. 1, 1933   3 Sheets-Sheet 2

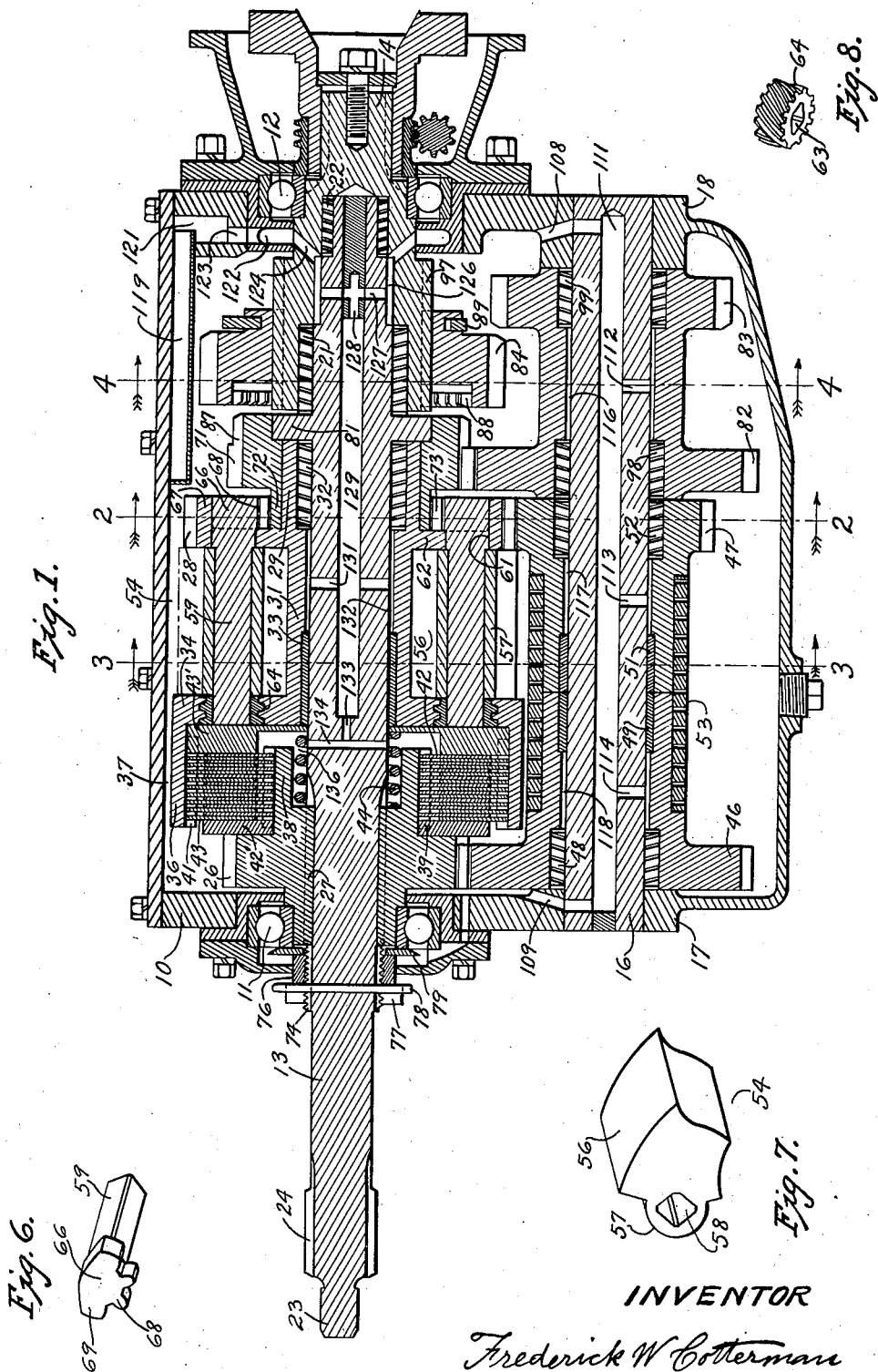

INVENTOR
Frederick W Cotterman

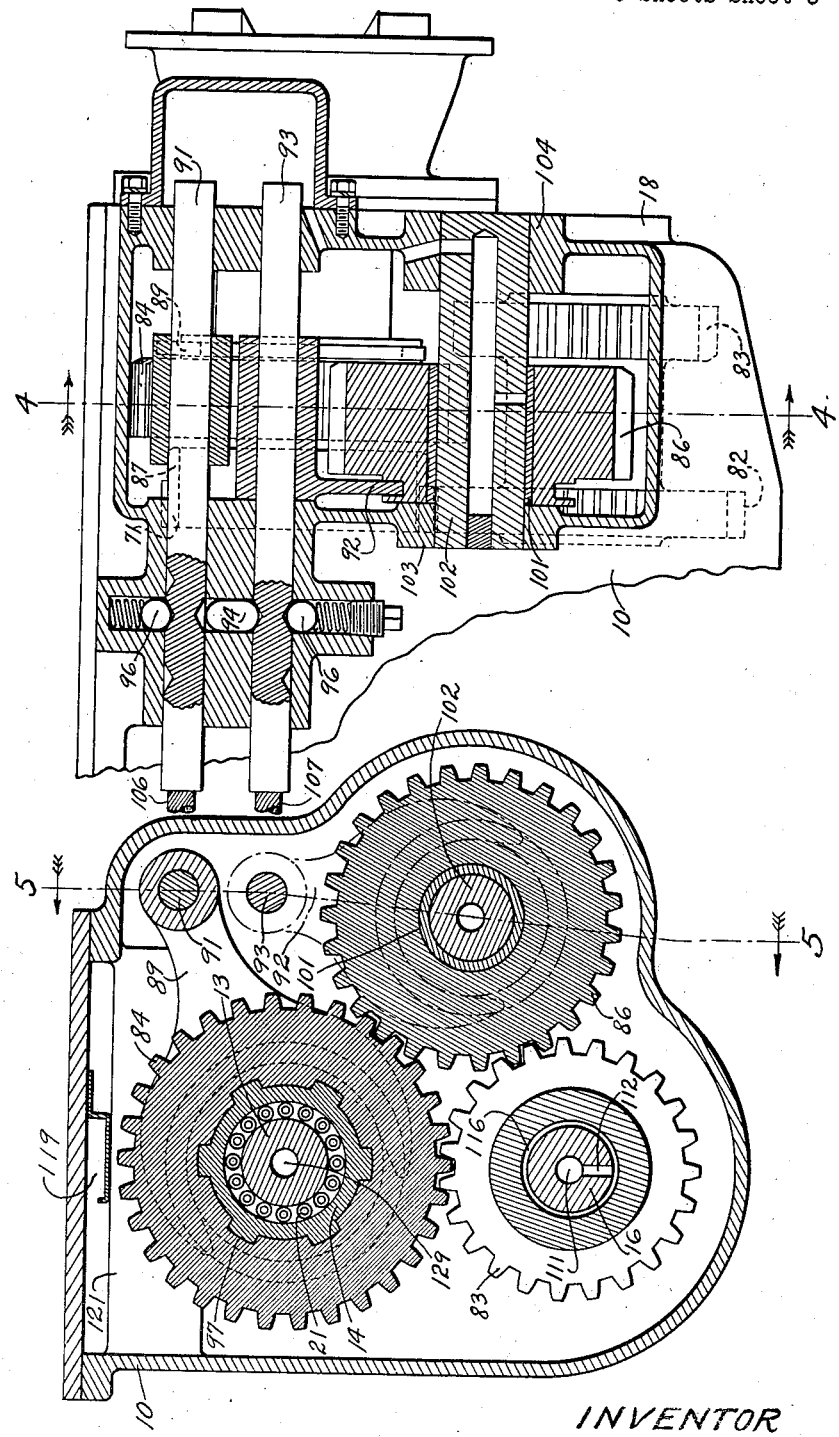

Patented Jan. 22, 1935

1,988,440

UNITED STATES PATENT OFFICE 1,988,440

AUTOMATIC AUTOMOTIVE TRANSMISSION GEARING

Frederick W. Cotterman, Dayton, Ohio assignor of one-half to Bessie D. Apple, Dayton, Ohio Application September 1, 1933, Serial No. 687,758

20 Claims. (Cl. 74—336)

This invention relates to transmission gearing, and is especially applicable to motor vehicles.

An object of this invention is to provide a mechanism which functions automatically to change the ratio of revolutions between the engine and the vehicle wheels for all ordinary driving conditions, but which comprises also a manually shiftable mechanism which may be employed in overcoming unusually heavy load conditions, and for driving down unusually steep hills "in gear" as well as for reversing the vehicle movement.

Another object is to provide in the automatic ratio changing mechanism, a means which will at all times strike a balance between the load which movement of the vehicle is presenting and the power which the manually controlled automotive engine is being made to develop, and then set the gear ratio accordingly, to the end that at any time that the load, as balanced against the power, does not require low gear, a shift to high gear will automatically take place, and at any time that the power, as balanced against the load, is insufficient to carry it in high gear, a shift to low gear will automatically take place.

Another object is to provide mechanism which balances the load against the power in such a way that the power tends always to engage a clutch for high speed drive, and the load tends always to disengage the said clutch for low speed drive, to the end that automatic ratio changing will take place, not at any particular vehicle speed, but at any time that the one force overbalances the other and engages or disengages said clutch.

Another object is to so balance the load, which tends always to disengage the clutch and cause low speed, against the power, which tends always to engage the clutch for high speed, that when the one force overbalances the other it does it completely and fully, to the end that the clutch will not, over extended periods of time, be partly but insufficiently engaged and subject to consequent wear.

Another object is to provide a clutch for automatically shifting from low to high gear ratio of such general type as is known to be successfully operable in an oil bath within the transmission housing, and which rarely if ever needs adjustment, but which may, if necessary, be adjusted by a single nut placed outside of the said housing and adjustable without opening the said housing.

Another object is to provide unique oiling means for all of the moving parts of the mechanism.

A more general object is to provide means to attain the foregoing objects with substantially no more mechanism, and requiring substantially no more space, and being of no greater cost than transmission gearing now in general use.

That I attain the foregoing objects will be apparent from a consideration of the following description when taken in conjunction with the drawings wherein, Fig. 1 is a longitudinal vertical axial section through the transmission mechanism.

Fig. 4 is a transverse section taken at 4—4 of Fig. 1 or of Fig. 5.

Fig. 5 is a longitudinal vertical section taken at 5—5 of Fig. 4.

Figure 3:
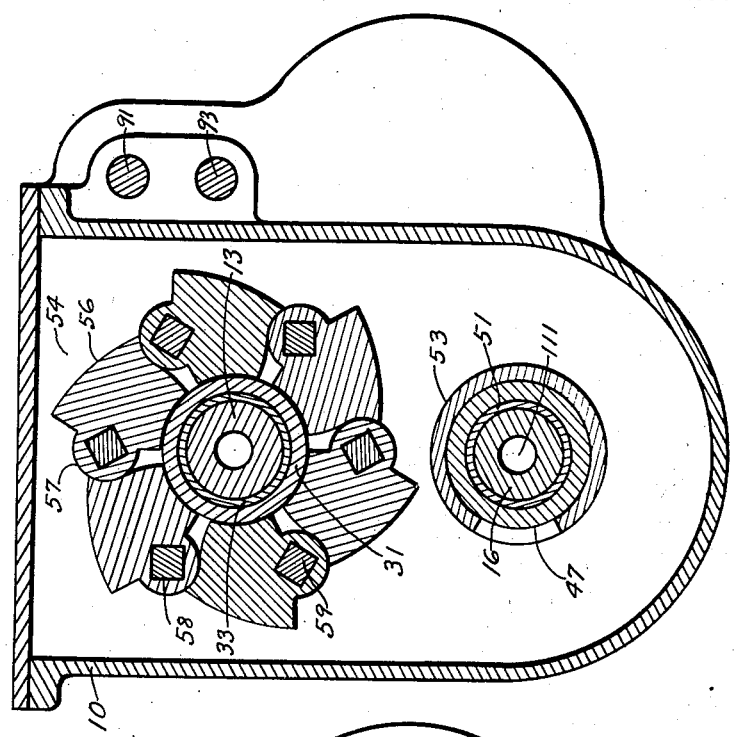
Figs. 2 and 3 are transverse sections taken at 2—2 and 3—3 of Fig. 1.

Figs. 6, 7, and 8 are perspective views of detail parts.

Similar numerals refer to similar parts throughout the several views.

An automotive transmission gear comprising a driving member, a driven member, gearing connecting them for low speed, and an automatic speed responsive clutch for connecting them directly for high speed is almost as old as the motor vehicle itself. Such a mechanism is now being commercially applied to a motor vehicle. It is fundamentally deficient in that it shifts from one ratio to another at a definitely fixed speed regardless of what the driving requirements of the moment happen to be.

One driving a motor vehicle may wish to start in gear but shift to direct drive at 10 M. P. H. or he may wish to remain in gear and not shift to direct drive until he attains 30 M. P. H. Or he may shift to direct drive at 10 M. P. H., increase his speed slowly to 20 M. P. H. and then conditions may arise which make it desirable or advisable to go back to gear drive and raise from 20 to 30 M. P. H. and then shift into direct drive again. The ideal automatic transmission should be able to thus make these shifts when required.

Another form of automatic transmission mechanism comprising a driving member, a driven member, gearing connecting them for low speed and an automatic torque responsive clutch for connecting them directly for high speed has been proposed for a considerable number of years.

Such a torque responsive mechanism is subject to the objection that it will shift from direct drive to gear drive only when a certain predetermined load is encountered regardless of what the balance between the load and the power happens to be. When the predetermined load is imposed it does not matter that the engine could easily be made to carry it in direct drive, the shift to low gear nevertheless takes place.

Conversely, one might be in a slow moving procession or in a traffic jam and wish to drive in gear at about 3 M. P. H., but being on level ground and under practically no load, the torque device would shift to direct drive regardless of the fact that minimum fuel was being fed and the desire was to reduce the engine to as low a speed as it would run and then drive the vehicle at this low engine speed through low gear to thus obtain the lowest possible vehicle speed.

It is apparent that neither a speed responsive device, nor a torque responsive device, nor both used together in the manner heretofore known or proposed will provide facilities equal to those obtainable with a manually shiftable transmission, because both devices shift at a set point.

In the mechanism hereinafter disclosed, a speed responsive device tends to engage the clutch for direct drive, while a torque responsive device operates on and opposes the speed responsive device, and this opposition to the speed responsive device varies at all times directly as the load varies. A description of the structure by which this is accomplished follows:

Rotatable within the housing 10 on ball bearings 11 and 12 is the high speed drive shaft 13 and the coaxial slow speed driven shaft 14. A parallel spaced apart countershaft 16 is non-rotatably fixed in the hubs 17 and 18. The rear end of the drive shaft 13 is rotatable within the driven shaft 14 on roller bearings 21 and 22. The front end of the drive shaft 13 is reduced in diameter at 23 for a ball bearing to provide support at this end of the shaft in the end of the engine crank shaft.

The drive shaft 13 is splined at 24 for the hub of a flywheel-clutch plate. The flywheel-clutch employed to drivably connect the shaft 13 to the engine may be the conventional foot operated type but is preferably a vacuum operated clutch such as is commercially known as the "Bendix vacuum" or the improvement thereon shown in my copending application S. N. 661,325, filed March 17, 1933.

Rotatable within the housing 10 about the axes of the shafts 13, 14, and 16 are the transmission gears, the front half of the housing containing the automatic gear set and the rear half the manual gear set. Each set comprises a drive gear, a driven gear, and two countershaft gears. For clearness of description the sets of gears will be referred to as the automatic gears and the manual gears. It will be observed that the last driven gear of the automatic set is the element from which power is taken to drive the manual set. This gear then becomes the drive gear of the manual set. For clearness therefore, the driving gear of the manual set will, when used in a combination of elements defining the automatic mechanism, be referred to as the power take-off element.

In the automatic gear set is the automatic drive gear 26 which has internal splines fitted snugly to the external splines 27 of the drive shaft 13. The gear 26 is the only gear of the entire mechanism which at all times rotates in unison with the drive shaft 13.

The automatic driven gear 28 has a hub 29 extending rearwardly and a hub 31 extending forwardly. A roller bearing 32 within the hub 29 and a bronze bushing 33 within the hub 31 provides rotative support for the gear 28 about the shaft 13.

At the forward end of the hub 31 is a relatively thick flange 34 which carries the drum 36 of a multiple disc clutch 37. The gear 28, the hubs 29 and 31, the flange 34 and the clutch drum 36 are integral, preferably a single steel forging machined as shown and hardened.

The automatic drive gear 26 has a rearwardly extending hub 38 with teeth 39 around its periphery. The drum 36 has internal teeth 41. One series of clutch plates 42 are internally toothed to fit into the teeth 39 and are consequently driven by the gear 26. The other series of clutch plates 43 are externally toothed to fit into the teeth 41 and consequently drive the drum 36.

One clutch plate 42' is thicker than the plates 42 and is preferably press fitted to the teeth 39 while the plates 42 are preferably axially slidable on the teeth 39. Also one plate 43' is thicker than the plates 43, but both the thin plates 43 and the thick plate 43' are axially slidable in the teeth 41 of the drum 36. A coil spring 44 presses the plate 43' rearwardly against the flange 34.

With the plate 43' in this position there will be sufficient space between all the plates to allow the gear 26 to rotate without driving the drum 36. A space of about .005 inch between each plate and the next will be sufficient.

A first automatic countershaft gear 46 and a second automatic countershaft gear 47 surround the countershaft 16. The said first gear 46 is rotatably supported on the roller bearing 48 and the bronze bushing 49 while the said second gear 47 is rotatably supported on the bronze bushing 51 and the roller bearing 52. A coil spring ratchet 53 connects the two gears 46 and 47 so that the gear 47 may revolve faster but not slower than the gear 46.

It will be apparent that when the clutch 37 is disengaged the drive will be from the gear 26 to the gear 46 to the ratchet 53 to the gear 47 to the gear 28. In this condition the gears 46 and 47 will be revolving in unison, but the gear 28 will be driven at a lower speed than the gear 26.

It will also be apparent that when the clutch 37 is engaged, the drive will be from the gear 26 through the clutch 37 directly to the gear 28, in which condition the gears 26 and 28 will revolve in unison but the gear 47 will be revolving faster than the gear 46 and neither of the gears 46 or 47 will be carrying any load.

The speed responsive mechanism for engaging the clutch 37 is of the centrifugal weight type. Six weights 54 (see Fig. 7) are circumferentially spaced apart in the space between the gear 28 and the flange 34. Each weight comprises a body portion 56 and a hinge end 57.

Figure 2:
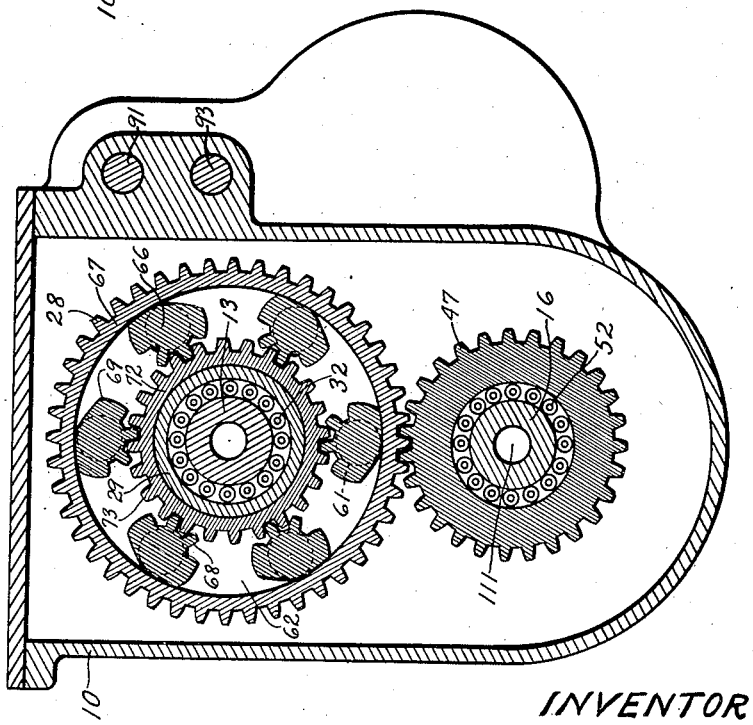

Square holes 58 pass axially through the hinge ends and square hinge pins 59 (see Fig. 6) fit snugly into these holes. One end of each hinge pin has a round portion 61 (see Fig. 1 or 2) which has rotative bearing in the web 62 of the gear 28. The other end of each hinge pin has its support in the square hole 63 (see Fig. 8) of a short hollow multiple thread screw 64. The six screws 64 are fitted into six multiple threaded holes in the flange 34.

The helix angle of the hollow screws 64 is preferably about 45 degrees and right hand, so that an outward movement of the body portions 56 of the weights away from the axis of the shaft 13, of such amount as will rotate the square pins about 1/24 revolution, will cause the hollow screws 64 to protrude forwardly from the flange 34 sufficiently to press the plates 43', 43, 42', and 42 together against the effort of the spring 44 and thereby engage the clutch 37.

From the foregoing it will be seen that if the mechanism is not revolving, or is revolving very slowly, the coil spring will push the plate 43' against the ends of the hollow screws 64 and force these back into the flange 34 whereupon the clutch is disengaged and the weights 54 are forced inwardly against the hub 31. The spring 44 is of sufficient strength to overcome the weights 54 and keep the clutch 37 disengaged until the weights revolve slightly under 34 R. P. M. which occurs when the vehicle is moving approximately 2/3 M. P. H. At this speed the weights have sufficient force to overcome the spring and engage the clutch mildly but not sufficient to carry any load. To carry full load a further increase to 83 R. P. M. or to 1.6 M. P. H. would be required.

Now if there was no other force beside the spring 44 tending to keep the weights 54 from moving outward and engaging the clutch 37, the mechanism would always operate to engage the clutch and shift from gear drive to direct drive at 1.6 M. P. H. But in addition to the force of the spring 44, there is a torque responsive mechanism which harnesses the entire torque load being used in moving the vehicle, and applies it to the weights 54 to pull them inward and keep the clutch 37 disengaged. The only time therefore, that the weights 54 will engage the clutch 37 at 1.6 M. M. H. is when the vehicle is coasting without any assistance from the engine. But whenever the vehicle is being engine driven, the M. P. H. at which the weights 54 will engage the clutch 37 for direct drive will vary according to the amount of stress at any time being created between the variable engine force and the variable load resistance. This torque responsive mechanism which thus operates on the speed responsive clutch engaging mechanism to vary the M. P. H. at which the clutch will engage for direct drive will now be described.

Each square hinge pin 59 has at its end as an integral part thereof, a pinion segment 66. These segments are contained in the space within the rim 67 of the gear 28 (see Fig. 2) and lie against the rearward face of the web 62. The pinions have but slight rotative movement and therefore have but two teeth 68. The lugs 69 serve as stops, acting against the inner face of the rim 67, to limit the rotative movement of the segments in either direction.

Surrounding and rotatably fitted to the rearwardly extending hub 29 is the gear 71. This gear 71 is the last member of the automatic unit and the first member of the manual unit. In defining the manual unit it will be referred to as the drive gear. But being the last power conveying member of the automatic set it will be called the power takeoff element when defining the automatic unit. The gear 71 has a forwardly extending hub 72 upon which gear teeth 73 are cut. The teeth 73 mesh with the pinion segment teeth 68 (see Fig. 2).

Now it matters not whether the automatic unit is in gear or in direct drive or whether the manual unit is in direct drive, gear drive, or reverse, the load is always transmitted in the same direction by pressure of the pinion segment teeth 68 against the gear teeth 73, and the heavier this pressure the more firmly the load forces the weights 54 inward toward the axis of the shaft 13 and keeps the clutch 37 disengaged for gear drive.

The centrifugal force of the weights 54 tending to engage the clutch 37 is of course, for any given speed, always the same. But whether or not that force will engage the clutch at that speed depends on whether the load restraint placed upon that force at that speed is greater or less than the force itself. It follows that the M. P. H. at which the clutch 37 changes from gear drive to direct drive depends on whether the load at the time is or is not greater than should be imposed on the direct drive.

At the forward end of the housing 10 the shaft 13 has threads 74 to which the nut 76 is fitted. The nut 76 is slotted at 77 and a pin 78 extends through this slot and through the shaft. An oil throw washer 79 is clamped between the nut 76 and the ball bearing 11.

When the weights 54 force the hollow screws 64 against the plate 43' to engage the clutch 37, the hub 29 is pushed axially against the collar 81 of the shaft 13. Now if is were not for the nut 76, the shaft 13 would be forced rearwardly and the clutch 37 could not be properly engaged. When, however, the nut 76 is properly adjusted, engagement of the clutch causes a pressure by the gear 26 forwardly against the nut 76 and a pressure by the hub 29 rearwardly against the collar 81.

When the mechanism is first put into use the clutch is preferably adjusted by screwing up the nut 76 tightly so that the plates 42, 42', 43, and 43' are packed tightly together and the weights 54 are all forced inwardly against the hub 31. The nut 76 is then backed away a complete turn and the pin 78 put in place. This will leave .005 inch between each plate and the next. This .005 inch will be taken up by movement of the weights 54 through half of their total possible travel. When the plates become worn so that there is .006 inch space between them, then the weights merely travel through six tenths of their total possible travel. When, however, the plates become worn so that there is .010 inch space between them then the total travel of the weights 54 is required to engage the clutch. When this condition is reached it is necessary to repeat the adjustment of the nut 76. This may be necessary once or twice during the life of the mechanism. It will be noticed that the nut 76 is outside the housing 10 so that the housing need not be opened to make the adjustment.

The manual gear set comprises the manual driving gear 71, the first and second manual countershaft gears 82 and 83, the sliding high and low gear 84 and the sliding reverse idler gear 86. The gears are shown in the neutral position. The gear 71 has part of its tooth face at 87 cut to smaller diameter to provide clutch teeth. The sliding high and low gear 84 has internal clutch teeth 88 corresponding to the clutch teeth 87.

A shifter fork 89 movable axially by the rod 91 is provided for moving the sliding gear 84. A second shifter fork 92 movable axially by the rod 93 is provided for moving the sliding reverse idler gear 86. A shifter rod lock 94 prevents either shifter rod moving from the neutral position shown when the other has already been moved. Detents 96 resiliently hold the rods to the several positions to which they may be moved. The gear 84 has internal splines which fit slidably over the external splines 97 of the shaft 14. The gears 82 and 83 are integral and revolve on roller bearings 98 and 99. The idler gear 86 has a bronze bearing bushing 101 and is rotatable about the shaft 102 which is nonrotatably held in the hubs 103 and 104.

When the gear 84 is shifted forwardly until the clutch teeth 87 enter the teeth 88, the connection which we may call manual high gear is made. When gear 84 is shifted rearwardly until it meshes with the gear 83, manual low gear is established. When the gear 84 is left in neutral as is shown in the drawings, and the idler gear 86 is shifted rearwardly, manual reverse connection is made.

When manual low gear connection is made and automatic low gear becomes effective, the drive is from shaft 13 through parts 26, 46, 47, 28, 68, 73, 71, 82, 83, 84 to the shaft 14. With the gearing proportioned as shown, the shaft 14 will be turning at ⅓ the R. P. M. of the shaft 13.

When manual high gear connection is made and automatic low gear remains effective the drive will be from the shaft 13 through parts 26, 46, 47, 28, 68, 73, 87, 88, 84 to the shaft 14. The shaft 14 will now turn at ½ the R. P. M. of the shaft 13.

When manual low gear connection is again made and automatic high becomes effective the drive will be from the shaft 13 through parts 26, 37, 31, 68, 73, 71, 82, 83, 84 to the shaft 14. The shaft 14 will now turn ⅔ as fast as the shaft 13.

When manual high gear connection is made and automatic high gear also becomes effective the drive will be from the shaft 13 through parts 26, 37, 31, 68, 73, 87, 88, 84 to the shaft 14. The shaft 14 will now revolve at the same speed as the shaft 13.

When the reverse idler gear 86 is shifted rearwardly as far as it will go, it will be in mesh with both the gear 83 and the gear 84 although the gears 83 and 84 will of course not be in mesh with each other. This will drive the shaft 14 at ⅓ the speed of the shaft 13 and in the opposite direction. By applying sufficient power to a light backing-up load the automatic high may be made to become effective and the shaft 14 will revolve oppositely and at ⅔ the speed of the shaft 13.

The means for shifting the rods 91 and 93 is not shown, but may comprise push button controls or similar means extending from the instrument panel of the vehicle connected to the rods by the flexible wire cables 106 and 107.

The lubrication of the countershaft 16 is a simple matter inasmuch as this shaft does not rotate. The oil enters the holes 108 and 109, fills the chamber 111 and flows out through the holes 112, 113 and 114 into the spaces 116, 117 and 118 and thence to all of the countershaft bearings.

The members, however, which rotate about the shaft 13 are more difficult to lubricate inasmuch as it is not easy to cause oil to flow inwardly, through radial holes, toward the axis of a rotating shaft. These parts are therefore lubricated as follows:

The oil is splashed by the gears 71 and 84 into the trough 119 from whence it flows into the reservoir 121. The annular groove 122 is kept filled from the reservoir 121 through the holes 123. Each time that the vehicle stops, oil flows from the groove 122 through the holes 124 into the annular space 126, thence through the small holes 127 and 128 into the large chamber 129 and outwardly through the holes 131 into the annular space 132. At first any air in the chamber 129 is driven out through the holes 133 and 134 into the space 136 within the clutch 37. But after all the air has been driven out, the oil follows out into the space 136 and keeps the metal clutch plates lubricated.

When the vehicle again moves, some of the oil will be thrown out through the holes 134 and 124, but there will be enough trapped in the chamber 129 to keep the bearing 33 lubricated until another stop is made. The reason the oil is trapped in the chamber 129 is because the entrance holes 128 and 133 are of smaller diameter than the chamber 129 itself. Thus the centrifugal force created by the weight of the revolving oil within the chamber 129 throws it against the outer wall of the chamber and it cannot then get out of the smaller holes 128 and 133 without moving toward the center of the shaft against centrifugal force. Lubricating mechanism similar to that herein described is shown and claimed in my copending application S. N. 67,238, filed June 10, 1933 and is shown herein and described merely to disclose a complete operative structure.

In operating a vehicle containing the herein described transmission mechanism anywhere except in mountainous country, after the engine is started and running smoothly, the gear 84 is preferably shifted forward until the clutch teeth 88 and 87 engage for manual high gear. The operator has then only to connect his engine to the shaft 13 by whatever means has been provided for this purpose, and he will move off in automatic low gear because automatic low gear is always in effect when the vehicle is at rest. If he now feeds the engine but a small amount of fuel, the clutch 37 may engage for automatic high gear at from 10 to 15 M. P. H. and the vehicle will continue in high gear at about that speed. If, however, he starts by feeding the engine its maximum fuel, automatic low will remain in effect until about 30 M. P. H. is reached, whereupon the clutch 37 will engage for automatic high.

If a hill is encountered which is too steep to be climbed in automatic high, a shift back to automatic low will take place and remain until the hill is overcome. The M. P. H. at which the shift back to automatic low takes place will depend always on the load which the hill imposes on the clutch operating gear teeth 73 as balanced against the fuel at that time being fed.

Thus if full fuel is being fed to the engine and the hill is so steep that the vehicle decelerates in spite of full fuel, the drop back to automatic low gear will take place at about 23 M. P. H. But if the vehicle is decelerating merely because very little fuel is being fed, and not because of any great load, then the shift to automatic low may not take place until about 8 M. P. H. is reached.

The manual high gear connection is maintained for all ordinary driving. The manual low gear connection may however be employed in mountainous country. Or it may be employed to start after it has become necessary to come to a full stop when ascending a steep hill. Or it may be employed when driving down a long steep incline where it is desirable to provide so-called engine braking by driving the engine with the vehicle movement at an increased engine speed.

The transmission mechanism herein shown and described is accurately proportioned in all its parts for an engine having a maximum torque of about 105 ft. lbs. at 3000 R. P. M. In the drawings the distance from the center of the ball bearing 11 to the center of the ball bearing 12 is 12⅜ inches. All parts are drawn to this scale. But in order that those skilled in the art may more readily adapt the invention to engines of other power, the procedure for arriving at the proportions shown in preferably set forth.

First the width of the gears which will safely transmit the 105 ft. lbs. is determined from well established engineering practice. This gives a reasonable estimate of what the distance between the ball bearings 11 and 12 should be. Next the diameter of a shaft supported only at points spaced apart a distance from bearing 11 to 12 may be determined. It should be large enough to meet common practice as to deflection.

With the shaft diameter fixed at its minimum the pitch diameter of the gear teeth 72 may be determined. This should be as small as practicable. In the instant case it is three inches. Next the load on these teeth caused by a torque of a 105 ft. lbs. applied to the shaft 13 is determined. The ratio of revolutions between the shaft 13 and the gear teeth 73 is 2 to 1. Therefore there is 2×105 ft. lbs. equals 210 ft. lbs. applied to the teeth 73. These teeth are 1.5 inches from the axis of the shaft 13. The 210 ft. lbs. then causes 12/1.5×210 equals 1676 lbs. to be applied to the teeth 73 at the pitch line.

This 1676 lbs. plus the 36 lbs. exerted by the spring 44 which totals 1712 lbs. is the amount of force which the outward movement of the weights 54 must exert before they can start to move outward to effect clutch engagement. After they move outward they must exert an additional 180 lbs. to effect complete clutch engagement.

Now it is desired that when the engine is exerting its maximum power of 105 ft. lbs. at 3000 R. P. M. that the vehicle be moving 30 M. P. H. when the mechanism is in manual high and automatic low, and that at the slightest increase over this point the automatic high will become effective. Therefore at slightly over this speed the weights 54 must exert a force sufficient to overcome the 1712 lbs. and start to move outward.

Now the pitch radius of the pinion segments 66 is .5 inch. The pitch radius of the hollow screw 64 is also .5 inch. But the center of gravity of a weight 54 is .87 inch from the center of the hinge pin 59. Therefore it takes only 50 lbs. outward force of a weight to exert 87 lbs. axial pressure on the clutch plates through the screw 64. Similarly it takes only 50 lbs. exerted by a weight to exert 87 lbs. pressure on the teeth 73 through the pinion segments 66. The center of gravity of the weights 54 is 1.865 inch from the axis of the shaft 13.

Knowing that, at the desired speed of 30 M. P. H. in automatic low, the weights 54 must exert an outward force of 1712 lbs. through a leverage of 87 to 50 or an actual outward force of 50/87×1712=984 lbs., the size of the weights may be determined to produce this force at this speed.

Applying the formula for centrifugal force,
F=.000341 W. R. N.² and substituting the known values we have,
984=.000341×W.×1.865/12×2 250 000; from this the value of W. is seen to be 8.25 lbs.

The cross section of a weight 54 is made to suit the space available for it. The length can then be so proportioned that the six weights together will weigh 8.25 lbs.

With the weights fixed at 8.25 lbs. and the engine producing 105 ft. lbs. torque, and the vehicle moving 30 M. P. H. the slightest increase in speed will cause the weights 54 to start outward.

Now the clutch adjusting nut 76 is so adjusted that the weights 54 must move outward an amount which changes their centers of gravity from 1.865 inch from the axis of the shaft 13 to 2.070 inch from the said axis, before the clutch 37 will be fully engaged. This change in the position of the centers of gravity of the weights takes place without any increase of speed. But the result of it is that the weight force which at the instant it overbalanced the load force was 984 lbs. now is 2.070/1.865 times 984 lbs. which is 1092 lbs. There is now a surplus of 1092−984=108 lbs. more force tending to move the weights outward than there is load tending to pull them inward. Thus when the centrifugal force of the weights reaches a point where it overbalances the load at all it at once overbalances it to the extent of 108 lbs.

This 108 lbs. is applied to the clutch plates by the screws 64 at a leverage of 87 to 50. The pressure, therefore, which is now applied to the clutch plates is 87/50×108 lbs. equals 188 lbs. or just slightly more than the 180 lbs. needed to effect clutch engagement.

Up to the time of complete clutch engagement it will be recalled that there was 984 lbs. load effort tending to move the weights 54 inward and 1092 or 108 more lbs. centrifugal force tending to move them outward. But at the instant of complete clutch engagement an unexpected result is achieved in this; that the gear teeth 73 are no longer rotating at ½ engine speed but are now rotating at full engine speed. It follows that the 105 ft. lbs. engine torque on the driving member which an instant before produced 210 ft. lbs. on the driven member because the driven member then revolved at half speed, now produces only 105 ft. lbs. on the driven member because it has assumed engine speed. The net result is that the load force tending to pull the weights inward which an instant before was 984 lbs. is now only 492 lbs. The outward weight force is still 1092 lbs. so instead of the force of 108 lbs. which engaged the clutch there is now an outward weight force of 1092−492 or 600 lbs. tending to move the weights out. This is applied to keep the clutch engaged after it is once engaged.

The foregoing is a highly desirable result, for if there was no more force applied to keep the clutch 37 engaged than was applied to engage it then the action would be something like this; the vehicle would reach 30 M. P. H. and the automatic shift from low to high would take place. If the vehicle then decelerated to 29.9 M. P. H., the automatic shift back to low would take place. If it again gained .1 M. P. H., a return to high would be effected. It will be seen that such action would soon wear out the clutch engaging mechanism.

But with the mechanism herein disclosed, when the engine is exerting 105 ft. lbs., and this force brings the vehicle up to 30 M. P. H., the centrifugal force tending to move the weights 54 outward and the load tending to pull them inward just balance at 984 lbs. Next the weights move outward to such an extent that they increase their centrifugal force until it is 108 lbs. more than the load force. Then the clutch engages and brakes the engine down to half its former speed, whereupon the load force is substantially halved and becomes about 492 lbs., which leaves 600 lbs. centrifugal force to keep the clutch engaged after 108 lbs. has engaged it.

By calculation from the foregoing basis it may readily be found that when maximum engine torque is being exerted, and the vehicle reaches 30 M. P. H. and shifts to automatic high, if the maximum engine torque is maintained, sufficient load must be encountered to decelerate the vehicle to 23 M. P. H. before the 600 lb. excess centrifugal force which kept the clutch engaged is wiped out and a balance between the centrifugal force and the load is again reached. When it is thus reached at 23 M. P. H. the shift back to automatic low takes place.

Here again an unexpected result takes place in this; that at the instant that the clutch 37 became disengaged, the force of the centrifugal weights tending to keep the clutch engaged was very little more than that of the force of the load tending to disengage it. But one or two seconds after clutch disengagement, the engine has doubled its speed and is driving in gear and consequently the load on the driven member rises to substantially double that which it was an instant before, without any change in vehicle speed. Thus there is now a load force tending to keep the clutch disengaged far in excess of the centrifugal force tending to engage it. It follows that after shifting into automatic gear, considerable vehicle speed must be gained in gear before a shift to direct drive may again be had.

The foregoing calculations show the size of the weights 54 necessary to cause a shift from low automatic to high automatic at 30 M. P. H. against 105 ft. lbs. engine torque, and a return to low automatic at 23 M. P. H. while the same 105 ft. lbs. engine torque is still being exerted. By a like calculation it may be found that with these same weights and the fuel reduced to provide only 21 ft. lbs. engine torque the shift up would take place at about 14¾ M. P. H. and the shift back at about 10 M. P. H.

It will now be seen that an operator of a vehicle equipped with the improved transmission mechanism herein shown may start by feeding fuel to create a torque of about 20 ft. lbs. whereupon the vehicle will be started in automatic low, raised to about 14 M. P. H. and shifted to automatic high. If he now increases the fuel gradually the vehicle will gain speed until it reaches its maximum without a shift back to automatic low. But if he wishes to accelerate more rapidly from 14 M. P. H. upward he may at once increase his fuel so as to provide about 45 ft. lbs. torque whereupon there will be a return to automatic low which will continue until a speed of about 19 M. P. H. is reached whereupon the shift to automatic high will again take place. If he now increases the fuel gradually he may raise the vehicle speed from 19 M. P. H. to its maximum speed without a return to automatic low. But if he increases the fuel at once to maximum, a second shift back to automatic low takes place which will then remain in effect until 30 M. P. H. is reached, whereupon the shift up to automatic high will again take place. After about 30 M. P. H. is attained no further shift back to automatic low may be effected by increasing the fuel. Of course the operator would probably not cause the automatic gear to shift as often as above indicated, but there are many instances in driving a conventional vehicle where the operator has shifted to high gear at a low rate of vehicle speed, then finds a sudden need to shift back to a lower gear to assist him to quickly pull out of a dangerous situation. In such a case the automatic device herein disclosed would shift back to a lower gear as a result of the simple and natural act of suddenly applying more fuel.

In my copending application S. N. 650,523, filed Jan. 6, 1933, I show an automatic transmission unit somewhat similar to the device herein shown. The important difference between that and the present application is as follows:

The copending application comprises an automatic clutch of small friction surface under high pressure. It takes about 1200 lbs. pressure to engage the clutch fully. Therefore an arrangement is provided whereby the entire load tends to keep the clutch disengaged but this tendency becomes zero the instant the clutch engages. It follows that the entire centrifugal force of the weights is thus made available to keep the clutch engaged when once it is engaged. The load no longer exerts the slightest effort to disengage the clutch after it is once engaged until after gear drive is resumed.

In the present application the load is applied to the clutch in such a manner that it operates to keep the clutch from engaging and also operates to try to disengage it whenever it is engaged. Thus the present clutch must be engageable with a pressure which is the difference between the centrifugal weight force and the load force. With a fairly large weight mass, 8¼ lbs., this difference is made as great as 180 lbs. This is sufficient to engage a multiple disc clutch which has a large friction surface and therefore requires only a moderate pressure. But to apply the present mechanism to a clutch requiring 1200 lbs. engaging pressure as in the copending application would require weights of prohibitive dimensions, inasmuch as this 1200 lbs. would have to represent the difference between the centrifugal force of the weights and the opposite force of the load.

By comparing the copending application and the present application it will be seen that in each case the automatic unit comprises a driving member and a driven mechanism, which driven mechanism is in two parts, i. e., the driven gear and the power take-off element. In the copending application the power take-off element is the clutch weight carrier while the driven gear carries the torque responsive means for pulling the clutch weights inward. In the present application the condition is reversed and the driven gear is the clutch weight carrier while the power take-off member carries the torque responsive means for pulling the clutch weights inward. The result is that in the copending application the load retards clutch engagement. It does not assist clutch disengagement. But in the present application the load both retards engagement and assists disengagement.

The foregoing comparison points out only the difference in principle between the copending application and the present application. Many differences in structure will be apparent.

Having described an embodiment of my invention, I claim,

1. The combination, in power transmission mechanism, of a driving gear, a driven gear, speed reducing gearing for connecting the driving and driven gears, clutch means on the driving gear and clutch means on the driven gear engageable for connecting the driving and driven gears to revolve in unison, centrifugal weights carried by said driven gear movable outwardly, means operated by said outward movement to engage said clutch means, a power take-off element, and a connection between said element to said weights for forcing said weights inward by the application of load to said power take-off element when said clutch is engaged.

2. The combination, in power transmission mechanism, of a driving gear, a driven gear, reduction gearing for connecting the driving and driven gears, clutch means on the driving gear and clutch means on the driven gear engageable for connecting the driving and driven gears to revolve in unison, overrunning means in the gear train for allowing the driven gear to revolve faster than it may be driven through the gear train, centrifugal weights carried on the said driven gear movable outwardly, means operative by said outward movement to engage said clutch means, a load responsive power take-off element, and means whereby said element is connected to said weights operative to advance said element in rotative movement with respect to said driven gear by outward movement of said weights.

3. In combination, power transmission mechanism comprising, a driving gear, a driven gear, reduction gearing for connecting the driving and driven gears, clutch means on the driving gear and clutch means on the driven gear engageable for connecting the driving and driven gears to revolve in unison, overrunning means for allowing the driven gear to revolve faster than it may be driven through said gear train, weights hinged to said driven gear swingable by centrifugal force in one direction about the hinge axis, means operable by said swinging movement for engaging said clutch means, a power take-off element, and means whereby said element is connected to said weights operative to swing them oppositely about said hinge pin by torque load applied to said element.

4. In power transmission mechanism, coaxially driving and driven members, means to rotate said members at different speeds, axially compressible clutch members engageable for connecting said members for revolving in unison, centrifugal weights swingable outwardly on axially parallel hinge means for rotating said hinge means in one direction, a torque responsive means for rotating said hinge means in the opposite direction, and means movable axially by rotation of said hinge means in the said one direction for compressing said clutch members.

5. Power transmission mechanism comprising, coaxial driving and driven members revolvable at different speeds, axially parallel hinge means, centrifugal weights on said hinge means swingable outwardly to rotate said hinge means in one direction, coaxial clutch members carried by said driving and driven members respectively at one end of said hinge means, torque responsive means at the other end of said hinge means, means at the said one end of the said hinge means movable axially to engage said clutch members by rotation of the hinge means by outward movement of said weights, and means at the other end of said hinge means for rotatively advancing said torque responsive means against its load by the said outward movement.

6. The combination, in power transmission mechanism, of a driving and a driven member revolvable at different speeds, clutch means engageable for connecting them to revolve at the same speed, axially parallel hinge means carried by the said driven member, centrifugal weight means carried by said hinge means swingable outwardly to rotate said hinge means in one direction, means rotatable by rotation of said hinge means in the said one direction to engage said clutch means, gear means on said hinge means for rotating said hinge means, and a power take-off element comprising gear means in mesh with the said gear means on said hinge means rotatable by load to rotate said hinge means oppositely of the rotation caused by the said outward movement of the said weight means.

7. Power transmission mechanism comprising, in combination, coaxial driving and driven members revolvable at different speeds, centrifugal weight means swingable outwardly away from the axis of rotation, axially parallel hinge means for said swingable weight means on said driven member, clutch members carried by said driving and driven members respectively at one end of said hinge means engageable by axial pressure for connecting said driving and driven members to revolve in unison, a torque responsive means at the other end of said hinge means, screw means on the said one end of the said hinge means for applying axial pressure to the said clutch members to engage said clutch by outward movement of said weight means, and gear means on the said other end of said hinge means engaged with corresponding gear means on the said torque responsive member for applying the load carried on said torque responsive means against rotation of said hinge means to engage said clutch.

8. The combination, in power transmission gearing, of driving mechanism comprising a driving gear and driving clutch means secured together to rotate in unison, driven mechanism comprising, driven clutch means, a centrifugal means, a driven gear and a power take-off element, the driven clutch means, the centrifugal means and the driven gear being secured together to rotate in unison, but the power take-off element being secured to the driven mechanism so as to have a fraction of a revolution of rotative movement with respect thereto, gearing for connecting the driving and driven gears to rotate said driven gear at a reduced speed, means operable by said centrifugal means to engage said driving and driven clutch means, and means connecting said power take-off element to said centrifugal means whereby said fraction of a revolution of rotative movement controls operation of said centrifugal means.

9. The combination, in power transmission gearing, of a driving member comprising driving clutch means, driven mechanism comprising, a driven clutch means, centrifugal weights, a driven gear and a power take-off element, the driven clutch means, the centrifugal weights and the driven gear being secured together to rotate in unison but the power take-off element being rotatable with the driven mechanism only by a connection to the said weights, gearing for connecting the driving and driven gear to rotate the driven gear at a reduced speed, and means operable by outward movement of said centrifugal weights to engage said driving and driven clutch means and to advance the rotation of said power take-off element a part of a revolution with respect to said driven clutch means.

10. The combination, in power transmission gearing, of a driving clutch member, a driven clutch member, gears for connecting said clutch members to revolve at different speeds, screw means associated with said clutch members rotatable for pressing said clutch members together to revolve at the same speed, centrifugal weights associated with said screw means operable outwardly to rotate said screw means in one direction to press together said clutch means, and a power take-off element operable by the torque load being transmitted to be rotated slightly backward in relation to said driven gear, and means connecting said power take-off element to said weights to draw said weights inwardly and rotate said screw means oppositely to release said clutch means.

11. In power transmission gearing, driving mechanism comprising a driving clutch member having a driving gear secured thereto, driven mechanism comprising a driven clutch member having a driven gear secured thereto, centrifugal weight means hinged to swing outwardly to press said clutch members together into driving contact, said driven clutch members, said weights and said driven gear all being secured together to rotate in unison, and a power take-off element separately rotatable with respect to said driven gear and said driven clutch means but having driving connection to a part of said centrifugal weight means which moves forwardly with respect to said driven gear when the body of said weights move outwardly.

12. Power transmission mechanism comprising, a driving gear having a driving clutch member secured thereto, an axially aligned driven clutch member having an elongated hub, a driven gear axially spaced apart from said driven clutch member affixed to said hub, gearing connecting the driving and driven gears, speed responsive mechanism, operable to engage said clutch members, around said hub between said driven clutch member and said driven gear, speed operated means operable by said speed responsive means extending through said driven gear to the side opposite said speed responsive means, and a torque reponsive means on said hub on the side of said driven gear opposite said speed responsive means given limited rotative movement on said hub, with respect to said driven gear, by a connection to said speed operated means.

13. Power transmission mechanism comprising, a driving gear having a driving clutch member secured thereto, an axially aligned driven clutch member having a driven gear secured thereto but axially spaced apart therefrom, gearing connecting the driving and driven gears, a speed responsive means in the space between said driven clutch member and said driven gear, a torque responsive means beyond said driven gear, means operable by said speed responsive means extending through said driven clutch member to operate said clutch, means operable forwardly of the direction of rotation by said speed responsive means extending through said driven gear connected to said torque responsive means, whereby operation of said speed responsive means to engage said clutch operates said torque responsive means against its torque load.

14. The combination, in a power transmission mechanism, of a driving gear having driving clutch means secured thereto, a driven clutch member having driven clutch means secured thereto, a driven gear rigidly secured to said driven clutch member to revolve therewith, gearing connecting the said driving and driven gears for revolving the driven gear at a reduced speed, a rotatable clutch engaging means carried on the driven clutch member for clamping the driving and driven clutch members together to rotate in unison, a speed responsive device for rotating said clutch engaging means in one direction to engage said clutch means, and a torque operated power take-off element having limited rotative movement with respect to said driven gear and said driven clutch member, and means connecting said element to said rotatable clutch engaging means operable by torque load on said element to rotate said clutch engaging means oppositely to disengage said clutch.

15. Power transmission mechanism comprising, a driving gear, a driven gear, speed reducing gearing connecting the driving and driven gears, a clutch for connecting the driving and driven gears, clutch operating means on said clutch rotatable in the one direction for engaging said clutch and in the other direction for disengaging said clutch, a power take-off element rotatable backwardly in relation to said driven gear by load on said element, means connecting said power take-off element to said rotatable clutch engaging means whereby said backward rotation rotates said clutch operating means and disengages said clutch, and a speed responsive means opposing said backward rotation of said element.

16. Power transmission mechanism comprising, in combination, a driving gear, a driven gear, gearing for connecting the driven gear to be revolved at a reduced speed by the driving gear, clutch means on the driving gear, clutch means on the driven gear, rotatable clutch operating means on the driven clutch means, and a power take-off element having limited rotation backwardly with respect to said driven gear and said driven clutch means, means connecting said power take-off element to said rotatable clutch operating means whereby said limited backward rotative movement of said power take-off element rotates said clutch operating means to disengage said clutch, and a speed responsive means connected to said power take-off element operable to rotate said power take-off element forwardly.

17. Power transmission mechanism comprising, in combination, a driving gear, a driven gear, gearing for connecting said driven gear to be revolved at a reduced speed by the driving gear, clutch means on the driving gear, clutch means on the driven gear, rotatable clutch operating means on the driven clutch means, and a power take-off element having limited rotative movement with respect to said driven gear and said driven clutch means, means connecting said power take-off element to said rotatable clutch operating means whereby rotation of said element in the one direction engages said clutch and in the other direction disengages said clutch, and a speed responsive device operable to assist said power take-off element when it is rotating in the direction to engage said clutch and to oppose said power take-off element when it is rotating in a direction to disengage said clutch.

18. In power transmitting mechanism of the character described, the combination of a driving member, a driven member, a centrifugal member carried by the driven member adapted by movement due to centrifugal force to effect direct driving connection between the driving member and the driven member, gearing connecting the driven member to the driving member for revolving the driven member at a reduced speed, a power take-off element having limited rotative movement with respect to said centrifugal member, and a torque responsive connection between said element and said centrifugal member for retarding the clutch engaging operation of said centrifugal member.

19. In power transmitting mechanism of the character described, the combination of a driving member, a driven member, a centrifugal member carried by the driven member having limited outward movement operative to effect direct driving connection between the driving member and the driven member, speed reducing gears connecting the driving and driven members, a power take-off element freely rotatable with respect to said centrifugal member on the driven member, and torque responsive means connecting said power take-off element to said centrifugal member whereby the limited outward movement of said centrifugal member limits the said rotative movement of said power take-off element with respect to said centrifugal member.

20. In power transmitting mechanism of the character described, the combination of a driving member, a driven member, clutch means on the driving member, clutch means on the driven member, clutch engaging means operable to press said clutch means into engagement, a centrifugal member on the driven member for operating said clutch engaging means, speed reducing gearing connecting the driving and driven members, a power take-off element having limited rotative movement with respect to said centrifugal member, resilient means uniformly urging said clutch engaging means out of engagement, and a torque responsive connection between said power take-off element and said centrifugal means urging clutch disengagement in proportion to the torque being transmitted.

FREDERICK W. COTTERMAN.